United States Patent
Schmidt

(10) Patent No.: US 6,783,165 B2
(45) Date of Patent: Aug. 31, 2004

(54) DRIVE MECHANISM UNIT FOR MOVING A COVER IN AN MOTOR VEHICLE

(75) Inventor: Horst Schmidt, Stuttgart (DE)

(73) Assignee: Beatrix Gross (DE)

( * ) Notice: Subject to any disclaimer, the term of this patent is extended or adjusted under 35 U.S.C. 154(b) by 0 days.

(21) Appl. No.: 10/354,490

(22) Filed: Jan. 29, 2003

(65) Prior Publication Data

US 2003/0141742 A1 Jul. 31, 2003

(30) Foreign Application Priority Data

Jan. 31, 2002 (DE) .......................... 102 03 744

(51) Int. Cl.[7] .................................................. B60R 7/00
(52) U.S. Cl. .................................................. 296/24.45
(58) Field of Search ........................... 296/216.02, 223, 296/146.16, 24.44–24.45

(56) References Cited

U.S. PATENT DOCUMENTS 4,650,243 A * 3/1987 Hanley et al. ............... 296/221
5,033,789 A * 7/1991 Hayashi et al. .......... 296/216.02
5,069,502 A * 12/1991 Sekine et al. ................ 296/223

FOREIGN PATENT DOCUMENTS

DE         195 39 848 A1    4/1997

* cited by examiner

Primary Examiner—Dennis H. Pedder
(74) Attorney, Agent, or Firm—Walter A. Hackler

(57) ABSTRACT

A drive mechanism unit (1) for moving a cover (9) in an motor vehicle comprises a motor (2) for driving a flexible shaft (3) and a gearing (4) for converting the rotation of the shaft (3) into a translation of a drive element (7) connected to the carrier, wherein the carrier is provided for deflecting the cover (9). The space required for installation was kept to a minimum. The drive is designed such that the cover (9) is extended and retracted in a uniform fashion. Mounting is quick and simple.

1 Claim, 3 Drawing Sheets

DRIVE MECHANISM UNIT FOR MOVING A COVER IN AN MOTOR VEHICLE

The present invention concerns a drive mechanism unit for moving a cover in an motor vehicle. The cover may be rigid, folded or, for a covering blind, rolled to be extendable or retractable.

BACKGROUND OF THE INVENTION

A cover serves to block the view into the trunk. The cover additionally has a safety function since the cover may retain objects in the trunk in case of an accident.

A covering blind known per se substantially consists of a winding shaft and a cover which can be wound onto the winding shaft by means of a spring means. The cover can be extended or retracted to cover parts of a trunk, loading space or other regions of a motor vehicle.

A station wagon has no permanent, stationarily mounted rigid cover or limit of the trunk such that the trunk can have a variable design and permit optimum loading of the vehicle.

In a similar fashion, covers are used also for coupe convertible cars with foldable metal roof. The vehicle roof which consists of several parts in these vehicles, can be automatically folded and stored in the trunk. A cover which subdivides the trunk must be drawn out before opening the vehicle roof. The drawn-out cover marks the available useful space of the trunk so that the user does not put any luggage in the region of the trunk which is required later by the folded vehicle roof. It shall be prevented that the vehicle roof squashes the luggage when the roof is introduced into the trunk or that the mechanism for moving the vehicle roof is damaged. The extended state of the cover can be monitored with an electric contact or a sensor to start motor-driven opening of the roof only when the cover has been extended.

Covers are also used as sun protection on the windows of the vehicle. The cover must be extended and retracted also in this case.

For this reason, the invention can be used anywhere in the vehicle where defined movement of a cover is required.

Manually operable covering blinds are known from practice for station wagons. A motor driven cover is disclosed e.g. in DE 195 39 848 A1.

SUMMARY OF THE INVENTION

The realization of electromotive drive mechanisms for covers in a vehicle poses in general the following technical problems: The space required for installation shall be as small as possible. The drive must be designed such that the cover is uniformly moved or extended or retracted. Mounting shall be quick and simple.

These problems are solved by a drive mechanism unit in accordance with claim 1 comprising a drive motor, preferably an electromotor, for driving a flexible shaft and a gearing for converting rotation of the shaft into a translation of a drive element connected with a carrier, wherein the carrier is provided for deflecting the cover.

In a preferred realization of the gearing, the gearing comprises a driven gear wheel for engagement in an outer profile of the flexible shaft.

The drive elements for moving the carrier may have different designs. The drive elements for reciprocating motion of the carrier may be formed by a flexible shaft whose surface has a profile into which the toothing of the driven gear wheel engages. On the other hand, the drive elements may be formed for deflecting the carrier through a deflected toothed belt which can be driven via the driven gear wheel. It is also feasible that the drive element is designed for reciprocating motion of the carrier through cable control or tension which can be wound via the driven gear wheel and is connected with the cover via the carrier.

A return spring may be provided whose spring force counteracts the winding process of the cable tension. The cover is automatically withdrawn into its initial position when the cable tension decreases. The return spring can be designed as tension or pressure spring depending on the arrangement of the cable control.

In accordance with the invention, the carrier is always connected to the drive element such that the carrier is displaced through actuation of the drive element. The carrier can be designed in different alternative shapes, i.e. as step, hook, slider, stop etc.

A preferred application of the drive mechanism unit for moving the cover in a motor vehicle, e.g. in a station wagon, is produced in that the electromotor for driving the flexible shaft is installed on the vehicle roof or vehicle inside roof and one drive element, one carrier and one gearing are each installed on or in the D-column of the vehicle wherein the gearing is provided for converting rotation of the shaft into a translation of a drive element for deflecting the carrier which engages on one end of the cover.

BRIEF DESCRIPTION OF THE DRAWINGS

The invention is explained in more detail in the following description with reference to schematic illustrations of one embodiment.

DETAILED DESCRIPTION

Figure 1:
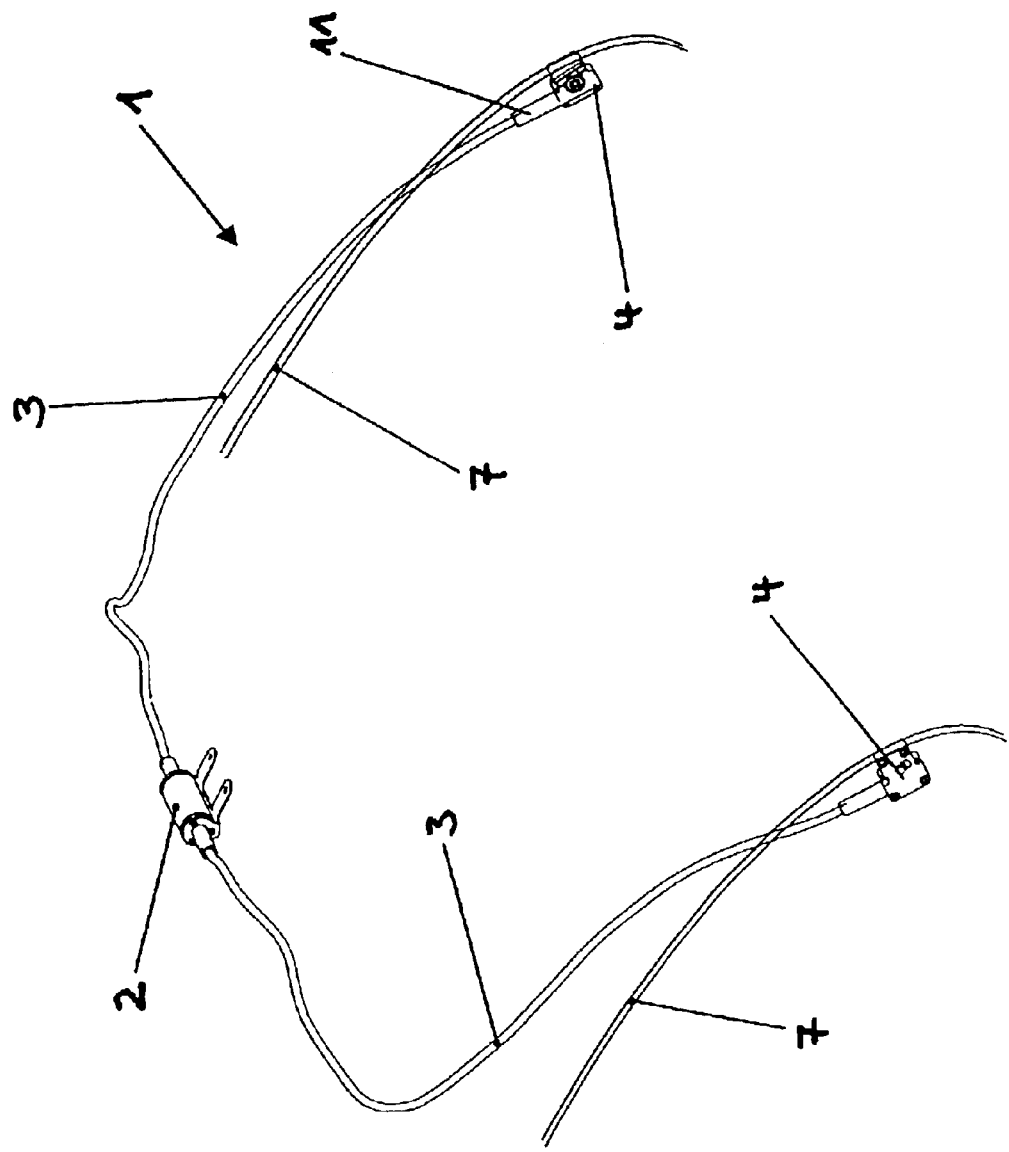
FIG. 1 shows a perspective view of essential parts of the drive mechanism unit of a covering blind.

FIG. 1 shows that a drive mechanism unit 1 for moving a cover (not shown in FIG. 1) of a covering blind comprises an electromotor 2, two flexible shafts 3 (one for the left and one for the right side of the cover) and two gearings 4 associated with one shaft 3 each. The cover can be wound onto a winding shaft by means of a spring means and can be extended and retracted. The spring means automatically retracts the cover. The embodiment shows a drive mechanism unit for a cover of a trunk of a station wagon.

The electromotor 2 or the drive mechanism unit 1 may be mounted to the vehicle roof or to other body regions of the vehicle, such as e.g. in the region of the D-column of the station wagon through fixing elements 5. The electromotor 2 drives the flexible shafts 3.

Figure 4:
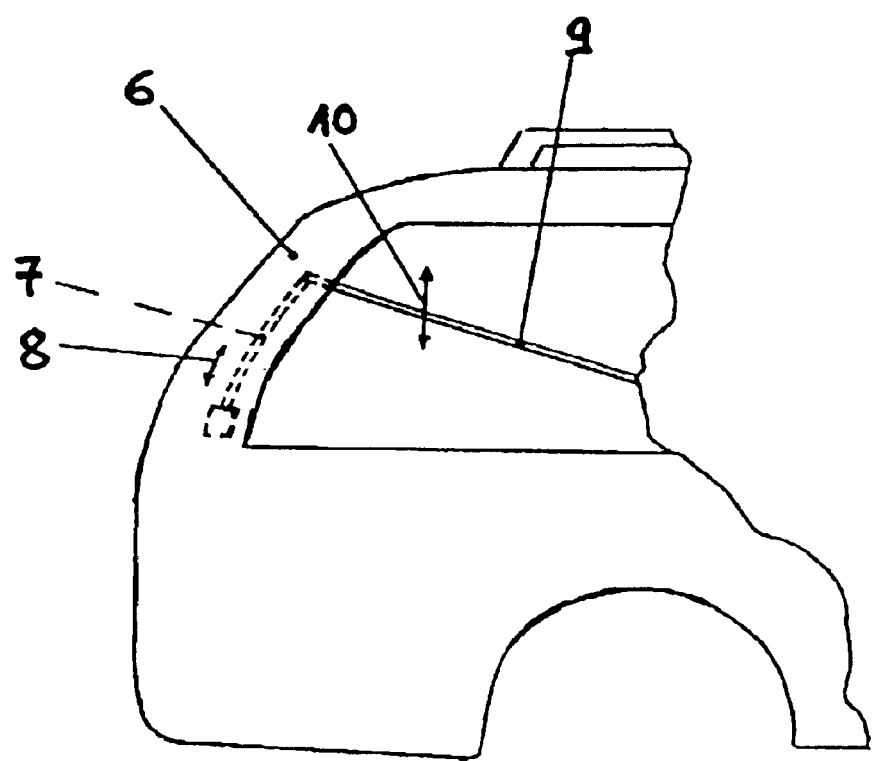
FIG. 4 shows the function of the drive mechanism unit of FIG. 1.

FIG. 4 shows the function of this drive. The flexible shafts (not shown in FIG. 4) of plastic or metal are accommodated on both sides each in a groove in a left and a right D-column 6 of a vehicle. Rotation of the flexible shafts is converted via the gearing 4 into a translational motion of the drive elements (shaft 7) disposed on both sides which are also movably disposed in a guiding rail in the D-column 6. The double arrow 8 shows clearly the translation of the drive elements 7. Each motion of a drive element 7 produces deflection of a carrier. The carrier may be rigidly mounted or movably positioned on an end of the drive element 7 facing away from the gearing 4. The carrier cooperates with the preferably reinforced end of a cover 9. For this reason, translation of the drive elements 7 and hence of the carrier may cause lifting of the cover 9 in a vertical direction 10 towards the vehicle roof.

Figure 2:
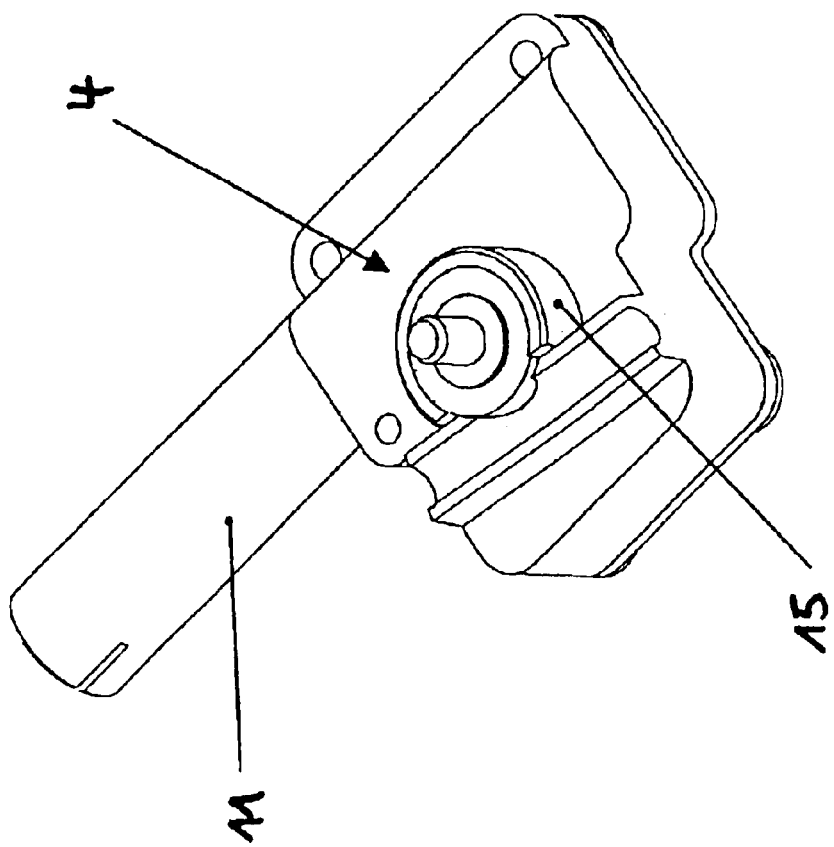
FIG. 2 shows a perspective view of a gearing of the drive mechanism unit.
Figure 3:
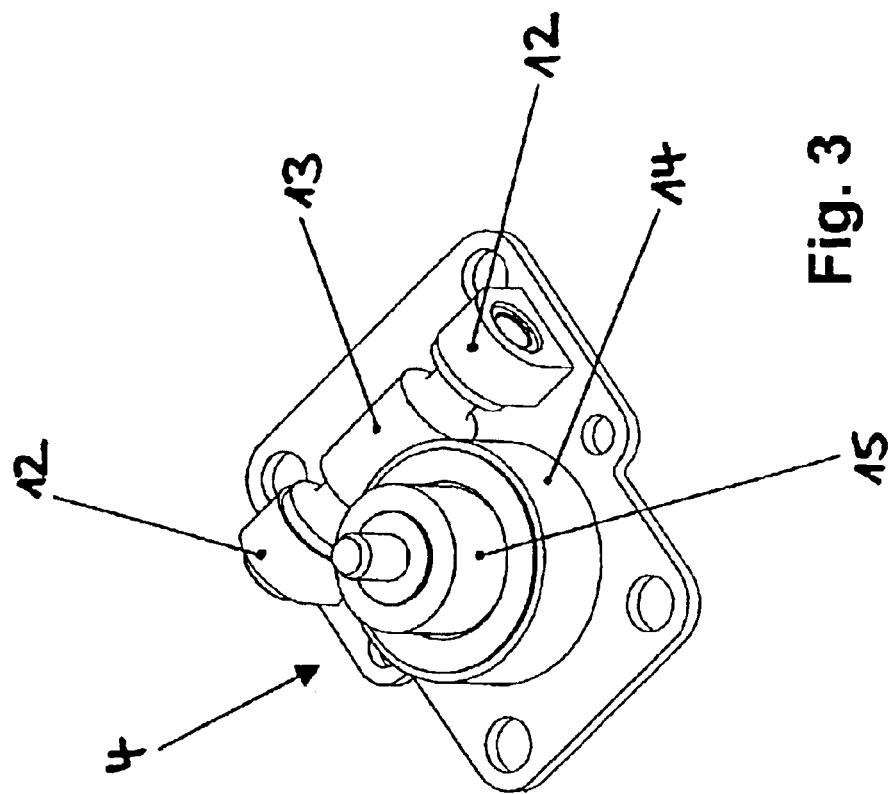
FIG. 3 shows a perspective view of the gearing of FIG. 2 after removal of the housing.

One end of the flexible shaft 3 is connected to the electromotor 2 and the other end is connected to the gearing 4. In accordance with FIGS. 2 and 3, the flexible shaft 3 introduced into a coupling 11 initially drives a worm 13 which is fixed in bearing shells 12 and whose motion is again transferred via a worm wheel 14 to a driven gear wheel 15. The surface of the drive elements 7 formed by a shaft is designed (toothing between grooves or profiles of the drive element 7 with teeth of the driven gear wheel 15) such that rotation of the driven gear wheel 15 is converted into a translation of the drive element 7.

The mechanical components of the drive shown in the figures can be combined with electrical contacts or sensors such that the state of the cover 9 is monitored and e.g. the cover is automatically lifted during opening of the tailgate. An operating switch may be mounted in the inside of the vehicle to lift the cover.

Although numerous combinations and operating mechanisms are possible, the following application will be standard: Initially, the cover is extended to a stop point in the region of the D-column and secured (closed position). When the tailgate is opened, the carrier moves upwards and deflects the cover in the direction of the vehicle roof from the originally horizontal cover level. The cover reaches a loading position for loading and unloading the trunk. If the rear flap is subsequently closed again, the drive element moves back, carrying along the cover and pushes the cover into the closed position. A final switch switches off the drive. Operating of the tailgate includes automatic lifting and lowering.

What is claimed is:

1. A drive mechanism unit for moving a cover in an automotive vehicle, the drive mechanism unit comprising:

a cover;

a pair of flexible shafts;

two drive elements connected to the cover, the drive elements being separately disposed in D-columns of said automotive vehicle;

gearings for converting rotation of the shafts into translational movement of the drive elements; and a motor for rotating the flexible shafts.

\* \* \* \* \*